United States Patent
Chen et al.

(10) Patent No.: US 9,384,404 B2
(45) Date of Patent: Jul. 5, 2016

(54) APPARATUS AND METHOD FOR CAPTURING A VITAL VASCULAR FINGERPRINT

(71) Applicant: The Regents of the University of California, Oakland, CA (US)

(72) Inventors: Zhongping Chen, Irvine, CA (US); Gangjun Liu, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 17 days.

(21) Appl. No.: 14/194,415

(22) Filed: Feb. 28, 2014

(65) Prior Publication Data
US 2014/0241596 A1     Aug. 28, 2014

Related U.S. Application Data

(60) Provisional application No. 61/770,876, filed on Feb. 28, 2013.

(51) Int. Cl.
G06K 9/00     (2006.01)

(52) U.S. Cl.
CPC .... G06K 9/00885 (2013.01); *G06K 2009/0006* (2013.01); *G06K 2009/00932* (2013.01)

(58) Field of Classification Search
None
See application file for complete search history.

(56) References Cited

U.S. PATENT DOCUMENTS

2008/0166029 A1*   7/2008   Presura .................. 382/124
2011/0150293 A1*   6/2011   Bower et al. ............ 382/117

OTHER PUBLICATIONS

Nasiri-Avanaki, Mohammad-Reza, et al. "Anti-spoof reliable biometry of fingerprints using en-face optical coherence tomography." Optics and Photonics Journal 1.03 (2011): 91.*
Larin, Kirill V., and Yezeng Cheng. "Three-dimensional imaging of artificial fingerprint by optical coherence tomography." SPIE Defense and Security Symposium. International Society for Optics and Photonics, 2008.*
Chang, S., et al. "Optical coherence tomography used for security and fingerprint-sensing applications." IET Image Processing 2.1 (2008): 48-58.*
Alex, Aneesh, et al. "Multispectral in vivo three-dimensional optical coherence tomography of human skin." Journal of biomedical optics 15.2 (2010): 026025-026025.*

* cited by examiner

*Primary Examiner* — Bhavesh Mehta
*Assistant Examiner* — Menatoallah Youssef
(74) *Attorney, Agent, or Firm* — Daniel L. Dawes; Marcus C. Dawes

(57) ABSTRACT

A method using optical coherence tomography to capture the microvascular network of the superficial layer of the finger skin for the purpose of fingerprint authentication and liveness detection. At the dermal papilla region, the vascular pattern follows the same pattern of the fingerprint and this vascular pattern forms a live vascular fingerprint. This live vascular fingerprint provides for ultrahigh security and a unique way for fingerprint-based personal verification. Because the system is based on blood flow, which only exists in a living person, the technique is robust against spoof attaching. After performing non-contact in-vivo imaging of a human fingertip, a three dimensional vasculature image is reconstructed from a plurality of vasculature tomography images and at least one vasculature fingerprint image which corresponds to the fingertip is extracted from the three dimensional vasculature image. This extracted image may then be compared to known fingerprint database for authentication or for liveness detection.

16 Claims, 5 Drawing Sheets
(3 of 5 Drawing Sheet(s) Filed in Color)

APPARATUS AND METHOD FOR CAPTURING A VITAL VASCULAR FINGERPRINT

RELATED APPLICATIONS

The present application is related to U.S. Provisional Patent Application Ser. No. 61/770,876, filed on Feb. 28, 2013, which is incorporated herein by reference and to which priority is claimed pursuant to 35 USC 120.

GOVERNMENT RIGHTS

This invention was made with government support under grant number EB-10090 awarded by the National Institutes of Health. The government has certain rights in the invention.

BACKGROUND

1. Field of the Technology

The disclosure relates to the field of capturing a vital vascular fingerprint, specifically the non-contact, in vivo imaging of a human vasculature fingerprint.

2. Description of the Prior Art

Regular morphology fingerprinting is heavily relied upon for identification purposes, but is an imperfect method of identification, which can be obstructed by an ordinary finger scar. It is further vulnerable to fabrication and cannot verify that the fingerprint belongs to a live person.

There have been attempts to remedy the shortcomings of fingerprint technology using the technique of finger vein authentication which uses LED and CMOS camera to capture large veins in the finger. However, this reveals a vein vascular pattern which is different from a morphology fingerprint pattern requiring an additional database for analysis.

It is known that capillaries on the palmar side of a finger follow the same pattern as a morphology fingerprint and there have been images taken of that pattern. Unfortunately, those images have been of limited usefulness because they have been limited to two dimensions and can only be obtained from non-living samples.

What is needed therefore is a system and method that can be used for non-contact, in-vivo imaging of a human vasculature fingerprint which also improves the reliability of fingerprint authentication through a unique vascular fingerprint by increasing its accuracy and verifying liveness.

BRIEF SUMMARY

The invention is directed to a system and method using optical coherence tomography (OCT) to capture the microvascular network of the superficial layer of the finger skin for the purpose of fingerprint authentication and liveness detection. Optical coherence tomography is a label-free, non-contact imaging technique which can image biological tissue at micron resolution and at fast image acquisition rates. Functional extensions of OCT based on the flow of blood cells in the vessels can be used for the imaging of vascular pattern of finger skin.

One purpose of the invention is to provide a system and method for efficient imaging of superficial blood vessels (including capillaries) in the network of the finger tip. It has been shown that the superficial capillary network in the papillary dermis of the fingertip follows the same pattern as the fingerprint. The capillary network is called a vascular fingerprint and can be used as a method for fingerprint authentication. However, the previous research was based on ex-vivo results and the method used cannot be using for a living human being. With functional OCT techniques, the three dimensional capillary network of the fingertip can be mapped. This capillary network can be used for fingerprint authentication and liveness detection. This invention proposes a method that combines regular morphology fingerprinting with vascular fingerprinting for more accurate identifications of the person. It can also enhance security for an authentication system. Because the system is based on blood flow, which only exists in a living person, the technique is robust against spoof attaching.

This invention describes a system and method for high resolution, three dimensional imaging of microvascular fingerprint from a live human. The advantages of the illustrated invention is threefold: (1) The vascular fingerprint may share the same fingerprint database as traditional fingerprint; (2) The principle behind the current method is based on the movement of red blood cells in the blood vessels so that the method provides intrinsic liveness information; and (3) Together with the three dimensional structure information provided by OCT, the three dimensional vasculature provides six dimensional information which is impossible to be duplicated.

The illustrated embodiments of the invention can be used for non-contact, three-dimensional, fast imaging of superficial vasculature pattern of the human finger. The vasculature pattern obtained can be used for fingerprint authentication and liveness detection. The system can be used for environments that require very high security and it may be used together with other authentication systems to provide liveness information.

In one embodiment, the invention provides a method for capturing a vital vascular fingerprint image. The method includes performing non-contact in-vivo imaging of a human fingertip to collect two dimensional vascular image data of the human fingertip, generating a plurality of vascular tomographic images from the two dimensional vascular image data, constructing a three dimensional vascular image of the human fingertip from the plurality of two dimensional vascular tomographic images, and extracting at least one vital vascular fingerprint image of the human fingertip from the three dimensional vascular image.

In one embodiment, the method step of extracting the at least one vital vascular fingerprint image of the human fingertip from the three dimensional vascular image includes extracting at least one en-face vascular image or at least one projection vascular image. This preferably can be done by summing up a plurality of en-face vascular images obtained from a pre-determined layer segment of the dermis of the human fingertip.

In another embodiment, the method step of extracting at least one vascular fingerprint image of the human fingertip from the three dimensional vascular image is done by extracting the at least one vascular fingerprint image from a region corresponding to the dermal papilla region of the human fingertip from the three dimensional vascular image.

Preferably, the performing of non-contact in-vivo imaging of the human fingertip is accomplished yb performing time domain or Fourier domain optical coherence tomography or Doppler optical coherence tomography.

In still a further embodiment, the method step of extracting at least one vascular fingerprint image of the human fingertip from the three dimensional vascular image includes extracting a vascular fingerprint image which comprises a three dimensional live pattern of the capillary blood vessels of the human fingertip.

The method further provides for generating a plurality of structure tomographic images from a set of two dimensional structure image data obtained from non-contact in-vivo imaging of the human fingertip, constructing a three dimensional structure image of the human fingertip from the plurality of two dimensional structure tomographic images, and then extracting at least one structure fingerprint image of the human fingertip from the three dimensional structure image. Layering of the at least one vascular fingerprint image with the at least one structure fingerprint image is then done to create a single integrated fingerprint image of the human fingertip.

The invention further provides a method for capturing a vital vascular fingerprint for fingerprint authentication, liveness detection and a structural fingerprint. The method includes performing non-contact in-vivo imaging of a human fingertip to collect vascular and structural image data of the human fingertip, generating a plurality of tomographic images from the vascular and structural image data of the human fingertip, and constructing a three dimensional image from the plurality of tomographic images both which three dimensional image includes a structural and vascular network pattern of the fingertip. At least one vital vascular or structural fingerprint image is then extracted from the three dimensional image and a fingerprint stored in an outside database which matches the at least one extracted vital vascular or structural fingerprint image is identified.

In one embodiment, the method step of generating a plurality of tomographic images from the vascular and structural image data of the human fingertip includes generating a plurality of vascular tomographic images and/or a plurality of structure tomographic images from the vascular or structural image data, respectively.

In another embodiment, the method step of extracting at least one vital or structural fingerprint image from the three dimensional image includes extracting at least one en-face image and/or at least one projection image. The en-face image may be an en-face vascular image, an en-face structural image, or both. Similarly, the projection image may be a projection vascular image, a projection structural image, or both.

In another embodiment, the method step of extracting at least one vital vascular or structural fingerprint image from the three dimensional image includes extracting the at least one vital vascular or structural fingerprint image from a region corresponding to the dermal papilla region of the human fingertip from the three dimensional image.

In yet another embodiment, the at least one vital vascular fingerprint image which is extracted from the three dimensional image comprises a three dimensional live pattern of the capillary blood vessels of the human fingertip.

Identification of a fingerprint stored in a database which matches the at least one extracted vital vascular or structural fingerprint image may include identifying a structural fingerprint stored in the database which matches a three dimensional live pattern of the capillary blood vessels of the human fingertip shown within the at least one extracted fingerprint image.

In another embodiment, the method step of extracting at least one vital vascular or structural fingerprint image from the three dimensional image includes extracting at least one vascular fingerprint image and at least one structure fingerprint image, and then layering the at least one vascular fingerprint image with the at least one structure fingerprint image to create a single integrated fingerprint image. Here, identifying a fingerprint stored in a database which matches the at least one extracted vital vascular or structural fingerprint image also includes identifying a fingerprint stored in the database which matches the single integrated fingerprint image.

Finally, the invention provides for a non-transitory, computer readable medium having stored thereon the extracted vital vascular or structural fingerprint image generated by the method of the current invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

The specification contains at least one drawing executed in color. Copies of this patent or patent application publication with color drawing(s) will be provided by the Office upon request and payment of the necessary fee.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Using fingerprints as a method to identify individuals has been accepted in forensics since the nineteenth century and fingerprinting has become one of the most widely used biometric characteristics. The fingerprint database is well established in most countries. Most of the modern fingerprint recognition systems are based on the print pattern of finger surface and are not robust against spoof attaching and there may be problems when there are scars or cuts on fingers.

Optical coherence tomography (OCT) is a noncontact imaging technique which can capture high resolution 3D images from within highly scattering biological tissues. There has been great interest to use OCT for fingerprint recognition and structures below the finger surface can be imaged with OCT. The human skin layer includes the epidermis, dermis, and hypodermis. The epidermis is the outermost layer of skin. The epidermis layer is free from any blood vessel. The layer beneath the epidermis is the dermis which contains two layers: the papillary and the reticular. At the papillary layer which is located at the junction between epidermis and dermis, the structure feature follows the same pattern as the external fingertip. This layer forms an internal fingerprint and has been demonstrated by OCT. In addition, there has been demonstration of imaging the sweat glands of fingertip to provide fingertip internal features. Although these demonstrations have enhanced the performance of high security biometric recognition, they are not able to provide the liveness information. The dermis contains capillary blood vessels and at the papillary layer, the capillary blood vessels (papillary loops) extend into the papillary ridge. The capillary blood vessel network is another kind of representation of the external fingerprint pattern.

Recently, we proposed a method for high resolution imaging of the microcirculation of the skin based on the flow of blood. In addition to the 3D structure information, we were able to obtain the 3D vasculature information based on a numerical algorithm. Blood vessels down to the capillary level in the skin were able to be captured with this method. The blood flow only exists in a live person so that imaging the blood vessels based on blood flow provides a way for a liveness test. This feature provides a way to capture the "live" fingerprint, that is, only the fingerprint from a live person will be captured and the fingerprint is, in actuality, obtained from the capillary vasculature network in the papillary dermis.

Figure 1:
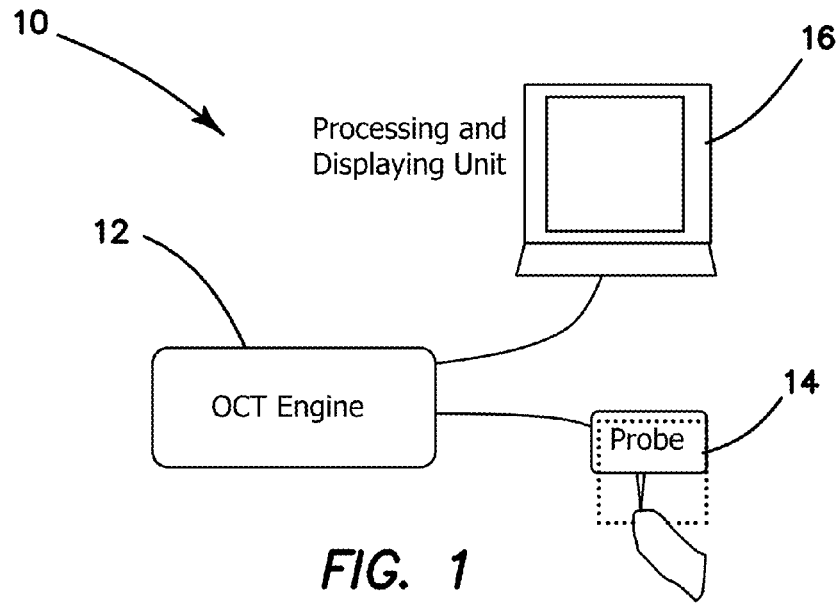
FIG. 1 is a general schematic diagram of the apparatus which performs the method for capturing a vital vasculature fingerprint.

FIG. 1 shows the scheme of a typical setup of the current invention which is a system 10 for capturing a vital vascular fingerprint. An OCT engine 12 is coupled to a probe 14 and to a processing and display unit 16 such as a computer or other equivalent structure. The OCT engine 12 may be any type of OCT engine, such as a time-domain OCT system, a spectrometer-based Fourier domain system or, a swept source Fourier domain system. The probe 14 includes beam scanning devices, for example a galvanometer-based mirror scanner and a beam focusing unit. The system 10 usually uses infrared light as a light source and the light is delivered to the probe 14 with via a fiber. The light beam is scanned by the scanning unit inside the probe 14 to provide a two-dimensional scanning pattern. The processing and displaying unit 16 controls the beam scanning device within the probe 14 and also is in charge of the data acquisition and processing.

Figure 2:
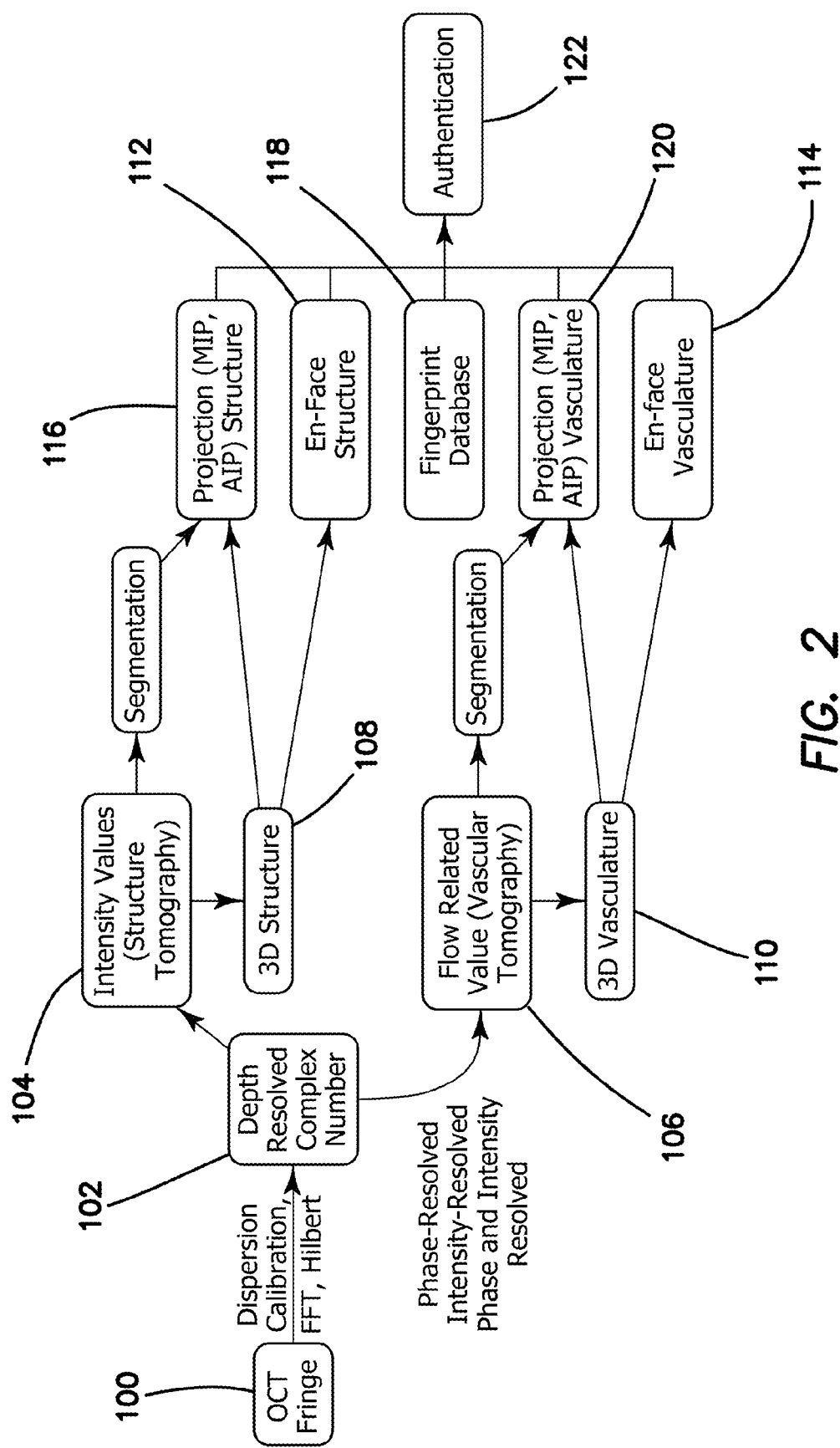
FIG. 2 is a flow diagram illustrating an embodiment of the method for capturing a vital vasculature fingerprint.

FIG. 2 shows is a flow diagram illustrating the method of operation of the current invention. The fringes are first acquired in step 100 by the OCT engine 12 and are then processed to obtain depth resolved complex number at step 102. Step 102 may include dispersion compensation and calibration to convert the wavelength space data into a linear wavenumber space and Fast Fourier Transform (FFT) (or Hilbert transform). The absolute values of the obtained depth encoded complex number are then used to get the structure tomography image at step 104. The vasculature tomography image may be obtained from different methods such as phase different among the adjacent A-lines, Doppler variance, Intensity-based Doppler variance, or Optical micro-angiography at step 106. From the multiple tomography images obtained, the three dimensional structure and vasculature information can be reconstructed at steps 108 and 110, respectively. The en-face structure and vasculature images at a certain depth or at a range of depths are then extracted from the three dimensional structure reconstruction at step 112 and from the three dimensional vasculature reconstruction at step 114. The projection structure or vasculature images can also be obtained in steps 116 or 120 respectively by summing up all the en-face images in a certain layer obtained through by layer segmentation and finally, by comparing the en-face or projection vasculature/structure images with a fingerprint database 118, the authentication of the fingerprint can be performed at step 122.

Figure 4:
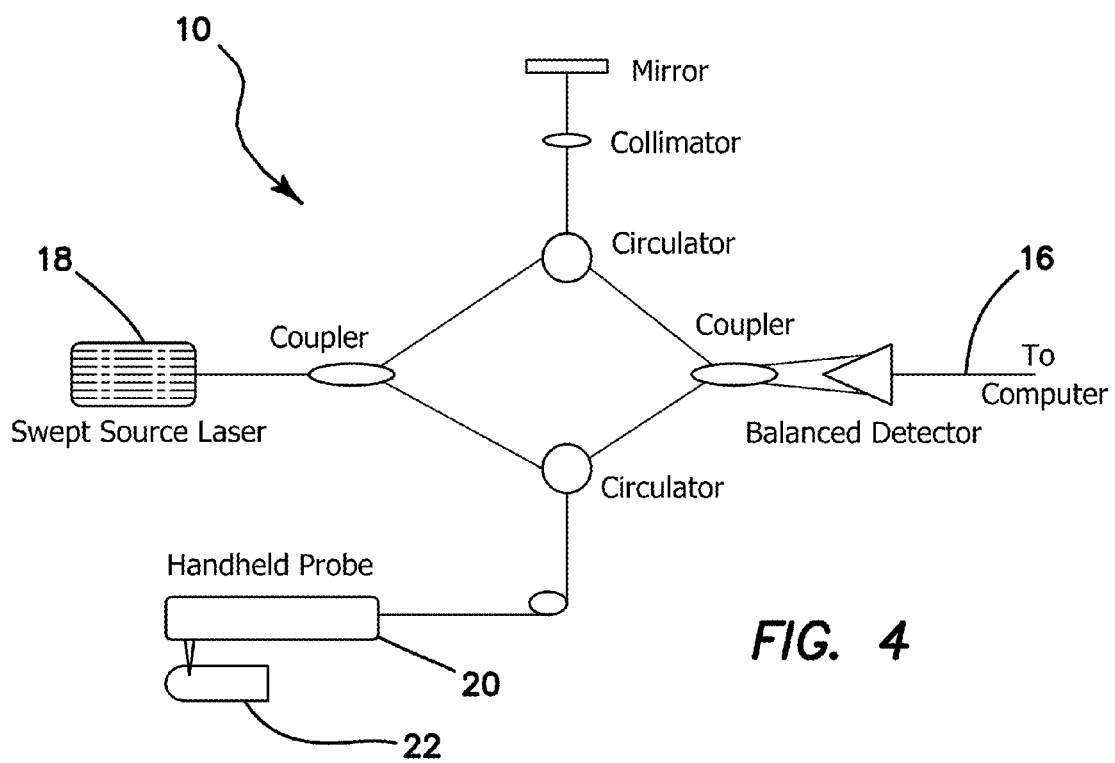
FIG. 4 is a schematic diagram of an embodiment of the apparatus which performs the method for capturing a vital vasculature fingerprint using a swept source OCT system.

For live vascular fingerprint imaging, either time domain OCT or Fourier domain OCT can be used. Here, we will demonstrate the capture of live vascular fingerprints with a swept source OCT system; however it should be noted that other OCT systems may be used without departing from the original spirit and scope of the invention. A more detailed embodiment of the system 10 seen in FIG. 1 is shown in FIG. 4. The system 10 uses a MEMS-based swept source laser 18 with a central wavelength of 1310 nm, an A-line speed of 50 kHz, and a total average power of 16 mW (SSOCT-1310, Axsun Technologies Inc., Billerica, Mass.). A Mach-Zehnder type interferometer was used and 90% of the laser light power was sent to the sample arm and 10% of the light in the reference arm. A dual-balanced detection scheme was used to acquire the signal. The system utilized K-trigger mode so that no re-calibration was needed. In the sample arm, a fiber collimator, a two-axial galvo mirror scanning system, and an achromatic doublet was used. The collimator, galvo mirror scanner, and the achromatic doublet are packaged in a handheld probe 20. The fiber collimator gave a beam diameter of 2 mm and with the 30 mm focusing length doublet, the system gave a lateral resolution of 14.6 µm. The bandwidth of the laser source was around 80 nm and the axial resolution of the system was 9.3 µm in air (6.6 µm in tissue). C++ platform based data acquisition software running on a 64 bit Windows 7 operation systems was used to control the galvo scanner and acquire the data.

The inter-frame intensity-based Doppler variance (IBDV) method that is derived from the phase resolved Doppler variance based on the autocorrelation algorithm was used to process the data and obtain the blood vessel network. Briefly, the amplitude autocorrelation between adjacent frames was used to obtain the variance value $$IBDV_{i,j,z} = 1 - \frac{\sum_{j=1}^{J}\sum_{z=1}^{N} P_{i,j,z} P_{i,j+1,z}}{\sum_{j=1}^{J}\sum_{z=1}^{N}\left(\frac{P_{i,j,z}^2 + P_{i,j+1,z}^2}{2}\right)},\qquad(1)$$

where $P_{i,j,z}$ is the amplitude (absolute value) for a pixel at a depth of z for the ith A-line in the jth frame. J is the number of averaged frames and N is the number of averaged depth pixels. In this experiment, the values for J and N were both set at 4 to balance between the signal-to-noise ratio, resolution, and computation time. The data processing included background fringe subtraction, spectrum shaping with a Gaussian function, and fast Fourier transform (FFT). The amplitude values of the final-depth encoded signals were used to calculate both the OCT images and IBDV images. And a threshold that is 1 dB above the OCT intensity noise floor was used to eliminate the low scattering but high noise region in the IBDV images. The velocity sensitivity of this method can be increased by increasing the time interval and the IBDV method is sensitive enough for the imaging of Brownian motion. The IBDV method is able to image the vessels in situations where the blood flow speed drops, such as temperature change or temporary blood occlusion. In addition to the IBDV method, phase resolved Doppler OCT, Doppler variance OCT, and other Doppler imaging methods can also be used for generating the vascular 3-D vascular images.

Figure 3:
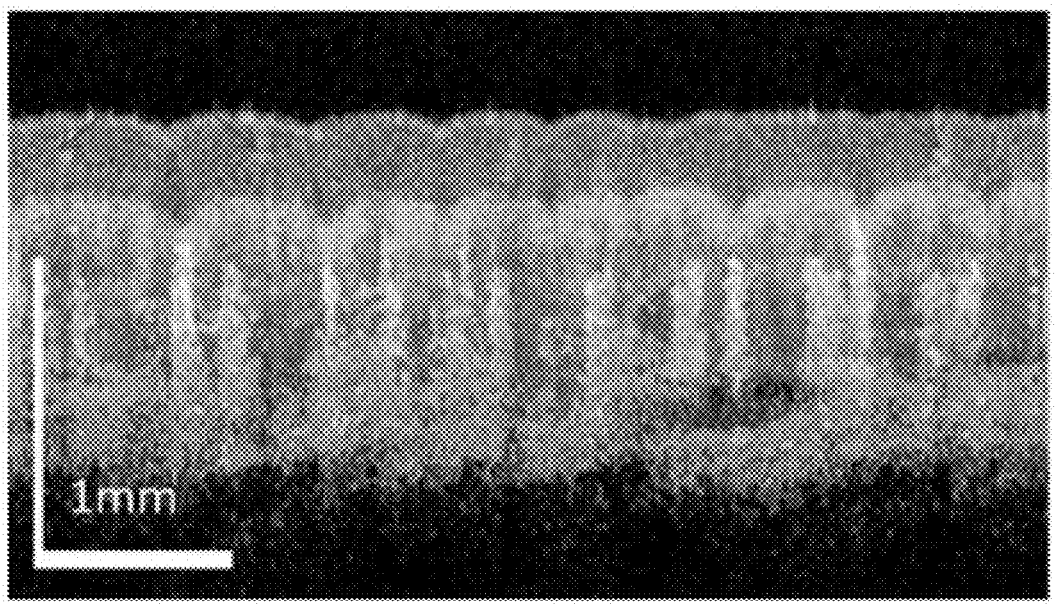
FIG. 3 is a photograph of an OCT structure image in gray overlayed over the vascular image in color as obtained by the current method.
Figure 5D:
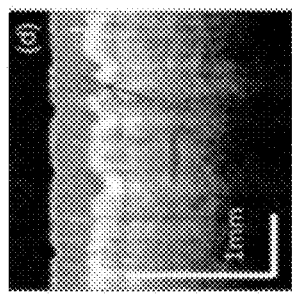
FIG. 5D is a cross sectional photograph of the OCT image along the red dotted line shown in FIG. 5C.
Figure 5H:
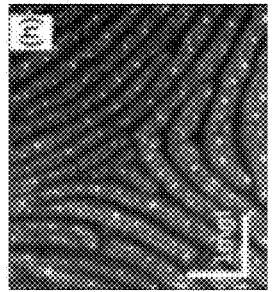
FIG. 5H is a photograph of the overlayed en-face images of sweat pores, capillary loop vasculature, and structure obtained by the method of the current invention.
Figure 5C:
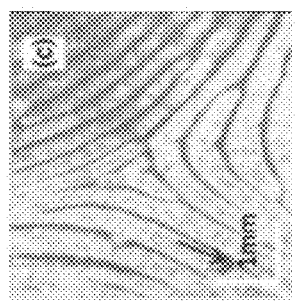
FIG. 5C is a photograph of the en-face OCT image beneath the tissue surface and at a depth in the dermal papilla region obtained by the method of the current invention.
Figure 5G:
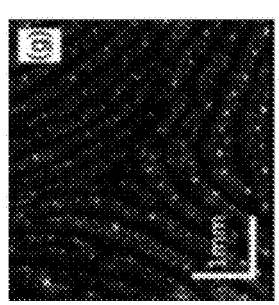
FIG. 5G is a photograph of the overlayed en-face images of sweat pores and capillary loop vasculature from 460-630 micrometers obtained by the method of the current invention.
Figure 5B:
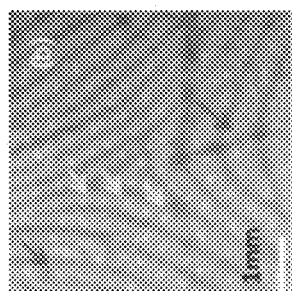
FIG. 5B is a photograph of the maximum intensity projection (MIP) image for the epidermis layers obtained by the method of the current invention.
Figure 5F:
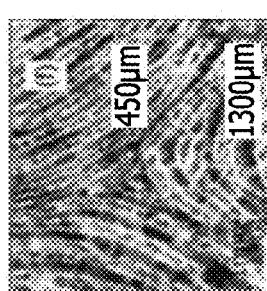
FIG. 5F is a photograph of the MIP vascular pattern up to a depth of 1.3 mm obtained by the method of the current invention.
Figure 5A:
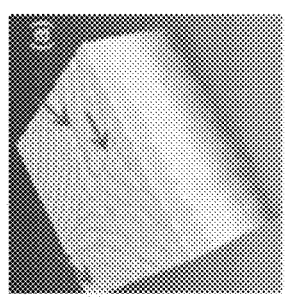
FIG. 5A is a 3D rendering of the OCT structure images obtained by the method of the current invention.
Figure 5E:
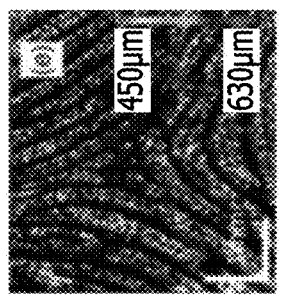
FIG. 5E is a photograph of the MIP vascular pattern around the dermal papilla region obtained by the method of the current invention.

In this experiment, the imaging area on a fingertip 22 was around 5 mm by 5 mm. The three dimensional data volume contained a total of 2000 frames with 512 A-lines per frame. The total imaging time was around 20 seconds. A custom C++ based software was used to process the acquired dataset and save the OCT structure and IBDV images. Those OCT structure and IBDV images were loaded into ImageJ (http://imagej.nih.gov/ij/) for further processing. The images were further smoothed with a Gaussian filter, which are built-in functions of ImageJ. The maximum intensity projection (MIP) en-face images for the vasculature or the structure were produced with ImageJ. The structure images were further loaded into Amira for three-dimensional rendering. FIG. 3 shows the overlaid image of OCT structural (shown in gray) and IBDV vasculature (shown in color) image from the thumb fingertip 22 of a volunteer. The structure image clearly shows the tissue layer boundaries and sweat pores (indicated by the arrows). The blood vessels are located several hundred microns beneath the skin surface so the vasculature patterns are not easily affected by fingertip dirt, superficial injury or scratches, which may affect the fingerprint pattern. FIGS. 5a-5h show the images of a fingertip with wrinkles or scratches on the fingertip surface. FIG. 5a shows the 3D rendering of the OCT structure image. The arrows indicate three wrinkles or scratches. FIG. 5b shows the MIP image for the epidermis layers. The yellow arrows point out three sweat pores. The blue arrows indicate three wrinkles or scratches. FIG. 5c is the en-face OCT image beneath the tissue surface and at a depth corresponding to the dermal papilla region. In this image, the three wrinkles or scratches do not show up and this means the wrinkle or scratches are only in the superficial layer. However, a very special region indicated by the red arrow is found on the en-face image. The OCT image of FIG. 5d along the red dotted line in FIG. 5c shows that there is a lesion in the dermal papilla. However, this lesion is not reflected on the finger surface. FIG. 5e shows the MIP vascular pattern around the dermal papilla region. This vascular pattern matches well with the en-face view OCT image in FIG. 5c. Note that the lesion region which is absent of any blood vessel is clearly seen in the vascular pattern. The MIP vascular pattern for the whole depth (around 1.3 mm depth) is shown in FIG. 5f. The lesion region is absent of blood vessels until a depth around 1.0 mm. This shows that the technique can also be used to evaluate the effect of a lesion or a cut on the fingerprint pattern. Since both the fingertip sweat pores and vasculature follow the same pattern as the fingerprint, they may be combined for high security biometric recognition. FIG. 5g shows the overlaid en-face images of sweat pores and capillary loop vasculature. The green color dots in FIG. 5g are sweat pores and red color dots in it are the capillary loops. FIG. 5h shows the overlaid en-face images of sweat pores in green, capillary loop vasculature in red, and the structure of the fingerprint as best seen in FIG. 5b in gray. The vasculature fingerprint matches the structure fingerprint very well as seen.

Figure 6A:
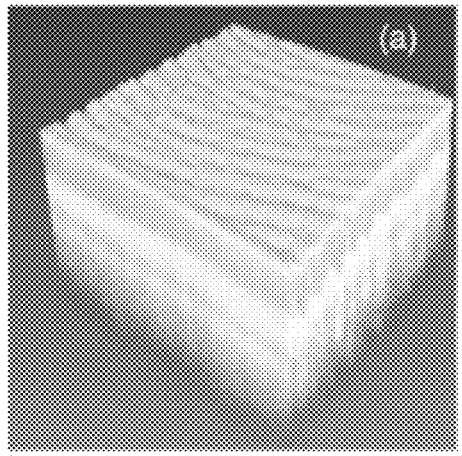
FIG. 6A is a 3D rendering of the OCT structure images obtained by the method of the current invention.
Figure 6B:
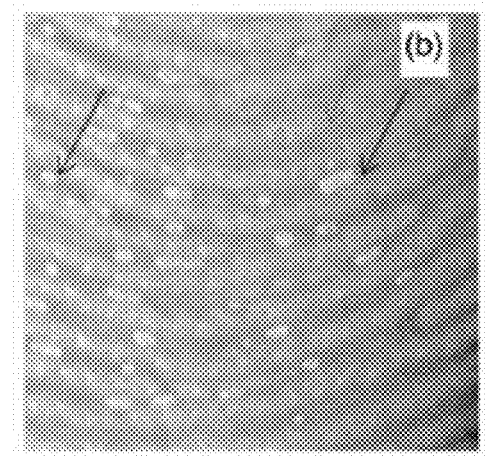
FIG. 6B is a photograph of the MIP image for the epidermis layer obtained by the method of the current invention.
Figure 6C:
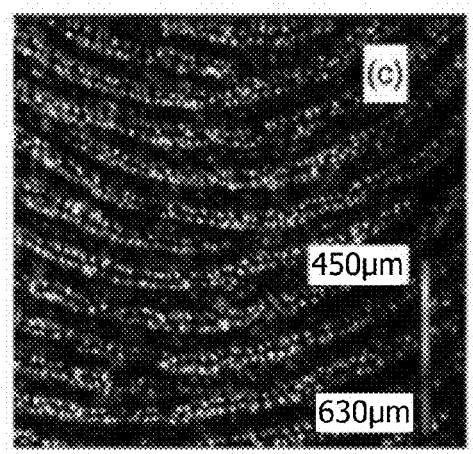
FIG. 6C is a photograph of the MIP vascular pattern around the dermal papilla region obtained by the method of the current invention.
Figure 6D:
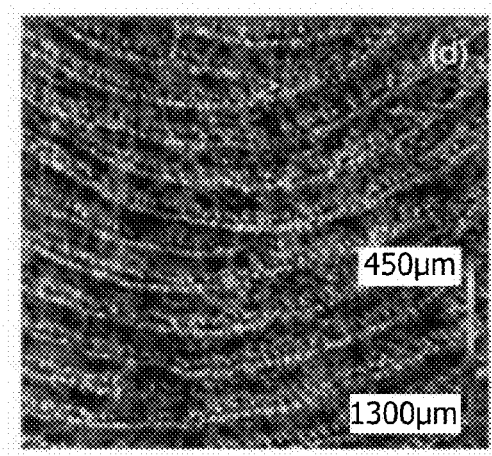
FIG. 6D is a photograph of the MIP vascular pattern up to a depth of 1.3 mm obtained by the method of the current invention.

FIGS. 6a-6d show the images of another fingertip. FIG. 6a shows the 3D rendering of the fingertip region of the OCT structure images. FIG. 6b shows the MIP structure image for the epidermis layer. The sweat gland pores can be seen in the image but the water drops (as indicated by the arrows) in the finger furrows degrade the fingerprint pattern and cause a misleading result. As discussed above, OCT provides the capability to image beneath the finger surface and the en-face view image around the dermal papilla region will provide an artifact-free fingerprint. FIG. 6c shows the blood vessel network around the dermal papilla region. In this region, the blood vessels are not connected horizontally. Following the pathological information of the skin on the human finger, we understood that the white dots were capillary loops. Generally, a single capillary loop extends into one dermal papilla. Just as the dermal papilla pattern follows the fingerprint pattern, the capillary loops also follow the fingerprint pattern. By comparing FIG. 6b with FIG. 6c, it can be found that there are two rows of capillary loops below each finger ridge, and these two rows of capillary loops follow the same pattern as the finger ridge which forms the fingerprint. This feature has been shown with an ex vivo method using a scanning electron microscopy (SEM). The microvascular pattern has been called "vascular fingerprint." The findings from current in vivo results agree well with the SEM results obtained with the corrosion cast technique for ex vivo cases. With the OCT techniques, the imaging depth can reach 1 to 2 mm and blood vessels in part of the reticular dermis region can also be imaged. FIG. 6d shows the microvascular pattern for the depth until 1.3 mm. In addition to the capillary vessels which follow the fingerprint pattern, larger blood vessels beneath these capillary vessels can also be seen. Vascular pattern is unique to each individual and there have been techniques to use the vascular pattern on a finger or hand for biometric applications. Different from the finger or hand vein recognition technique, which originate its contrast from the absorption of hemoglobin or melanin and captures large vein vessels to provide two-dimensional vein patterns, the vascular pattern obtained here is three-dimensional and the capillary blood vessels at the superficial layer of tissue are imaged. The physical principle of the current method is based on the flow of blood. Therefore, the microvascular pattern shown here is a three dimensional live pattern. Blood vessels without blood flow will not be captured by this method.

The applications of blood vessel information are severalfold. First, the detection of blood vessels is based on the blood flow, so liveness information of the sample can be obtained accordingly. The blood vessel network may not be necessary and a small imaging area or even a single tomography image is enough for liveness detection. Second, the capillary vessel (or capillary loop) network existing in the papillary dermis of the fingertip provides a live fingerprint pattern, which is impossible to duplicate or fake. This "live" fingerprint pattern may use the established fingerprint database for verification or recognition purposes. Third, the three-dimensional blood vessel network itself is unique for each individual and can serve as a way for authentication applications. Fourth, the current system can image both the structure and vasculature of the fingertip and identification can be performed from both the structure and vasculature information.

With the current system, it will take 20 seconds to acquire the whole 3D data. In the future, a faster system with more than 200 kHz A-line rate will reduce the imaging time to less than 5 seconds, which is sufficient for fingerprint applications. With a faster system, the motion artifacts will be also reduced. A contact mode OCT imaging probe may be used to further reduce the motion artifacts. Specular reflection from the finger-air interface may be reduced with contact mode OCT probe and water or ultrasound gel as index matching media. The field of view of the system is dependent on the focusing objective and our current system uses an objective with focusing length of 30 mm. With this objective, a field of view of more than 10 mm by 10 mm can be achieved. However, with a larger field of view, the imaging time will be increased.

In summary, with OCT, we demonstrated in vivo imaging of three-dimensional microcirculation or the vascular pattern in the superficial layer (1.3 mm) of human fingertip skin. At the dermal papilla region, the vascular pattern follows the same pattern of the fingerprint and this vascular pattern forms a live vascular fingerprint. This live vascular fingerprint provides for ultrahigh security and a unique way for fingerprint-based personal verification.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for capturing a vital vascular fingerprint image comprising:
    performing non-contact in-vivo imaging of a human fingertip to collect two dimensional vascular image data of the human fingertip using inter-frame intensity-based Doppler variance (IBDV) optical coherence tomography (OCT);
    generating a plurality of vascular tomographic images from the two dimensional vascular image data;
    constructing a three dimensional vascular image of the human fingertip from the plurality of two dimensional vascular tomographic images; and
    extracting at least one vital vascular fingerprint image of the human fingertip from the three dimensional vascular image.

2. The method of claim 1 where extracting the at least one vital vascular fingerprint image of the human fingertip from the three dimensional vascular image comprises extracting at least one en-face vascular image or at least one projection vascular image.

3. The method of claim 2 where extracting the at least one projection vascular image comprises summing up a plurality of en-face vascular images obtained from a pre-determined layer segment of the dermis of the human fingertip.

4. The method of claim 1 where extracting at least one vascular fingerprint image of the human fingertip from the three dimensional vascular image comprises extracting the at least one vascular fingerprint image from region corresponding to the dermal papilla region of the human fingertip from the three dimensional vascular image.

5. The method of claim 1 where extracting at least one vascular fingerprint image of the human fingertip from the three dimensional vascular image comprises extracting a vascular fingerprint image which comprises a three dimensional live pattern of the capillary blood vessels of the human fingertip.

6. The method of claim 1 further comprising:
   generating a plurality of structure tomographic images from a set of two dimensional structure image data obtained from non-contact in-vivo imaging of the human fingertip;
   constructing a three dimensional structure image of the human fingertip from the plurality of two dimensional structure tomographic images;
   extracting at least one structure fingerprint image of the human fingertip from the three dimensional structure image; and
   layering the at least one vascular fingerprint image with the at least one structure fingerprint image to create a single integrated fingerprint image of the human fingertip.

7. A method for capturing a vital vascular fingerprint for fingerprint authentication, liveness detection and a structural fingerprint comprising:
   performing non-contact in-vivo imaging of a human fingertip to collect vascular and structural image data using inter-frame intensity-based Doppler variance (IBDV) optical coherence tomography (OCT) of the human fingertip;
   generating a plurality of tomographic images from the vascular and structural image data of the human fingertip;
   constructing a three dimensional image from the plurality of tomographic images both which three dimensional image includes a structural and vascular network pattern of the fingertip;
   extracting at least one vital vascular or structural fingerprint image from the three dimensional image; and
   identifying a fingerprint stored in a database which matches the at least one extracted vital vascular or structural fingerprint image.

8. The method of claim 7 where generating a plurality of tomographic images from the vascular and structural image data of the human fingertip comprises generating a plurality of vascular tomographic images or a plurality of structure tomographic images from the vascular or structural image data.

9. The method of claim 7 where extracting at least one vital vascular or structural fingerprint image from the three dimensional image comprises extracting at least one en-face image or at least one projection image or both.

10. The method of claim 9 where extracting at least one en-face image comprises extracting at least one en-face vascular image and/or at least one en-face structural image.

11. The method of claim 9 where extracting at least one projection image comprises extracting at least one projection vascular image and/or at least one projection structural image.

12. The method of claim 7 where extracting at least one vital vascular or structural fingerprint image from the three dimensional image comprises extracting the at least one vital vascular or structural fingerprint image from a region corresponding to the dermal papilla region of the human fingertip from the three dimensional image.

13. The method of claim 7 where extracting the at least one vital vascular fingerprint image from the three dimensional image comprises extracting a fingerprint image which comprises a three dimensional live pattern of the capillary blood vessels of the human fingertip.

14. The method of claim 7 where identifying a fingerprint stored in a database which matches the at least one extracted vital vascular or structural fingerprint image comprises identifying a structural fingerprint stored in the database by matching the structural fingerprint with a three dimensional live pattern of the capillary blood vessels of the human fingertip shown within the at least one extracted fingerprint image.

15. The method of claim 7 further comprises extracting at least one vascular fingerprint image and at least one structure fingerprint image, and layering the at least one vascular fingerprint image with the at least one structure fingerprint image to create a single integrated fingerprint image.

16. The method of claim 15 further comprises identifying a fingerprint stored in the database which matches the single integrated fingerprint image.

* * * * *